US009632354B2

United States Patent
Chang (10) Patent No.: US 9,632,354 B2
(45) Date of Patent: Apr. 25, 2017

(54) BACKLIGHT MODULE AND LIGHT SOURCE ASSEMBLY OF THE BACKLIGHT MODULE

(71) Applicant: HON HAI PRECISION INDUSTRY CO., LTD., New Taipei (TW)

(72) Inventor: Shao-Han Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 242 days.

(21) Appl. No.: 14/518,445

(22) Filed: Oct. 20, 2014

(65) Prior Publication Data

US 2015/0168782 A1 Jun. 18, 2015

(30) Foreign Application Priority Data

Dec. 16, 2013 (CN) .......................... 2013 1 0685388

(51) Int. Cl.
*G09F 13/04* (2006.01)
*G02F 1/1335* (2006.01)
(Continued)

(52) U.S. Cl.
CPC .......... *G02F 1/133603* (2013.01); *F21K 9/60* (2016.08); *F21V 5/04* (2013.01); *F21V 7/10* (2013.01); *F21V 13/04* (2013.01); *F21V 13/12* (2013.01); *F21V 29/2212* (2013.01); *G02B 6/003* (2013.01); *G02B 6/0031* (2013.01); *G02B 6/0073* (2013.01); *G02B 6/0085* (2013.01); *F21V 29/74* (2015.01); *F21Y 2101/00* (2013.01); *F21Y 2103/10* (2016.08); *F21Y 2115/10* (2016.08); *G02B 6/002* (2013.01);
(Continued)

(58) Field of Classification Search
CPC . F21K 9/60; F21V 13/04; F21V 13/10; F21V 29/2212; F21V 29/74; F21Y 2101/00; G02B 6/002; G02B 6/0031; G02B 6/0073
See application file for complete search history.

(56) References Cited

U.S. PATENT DOCUMENTS 5,136,483 A * 8/1992 Schoniger ............ F21S 48/1159
362/231
6,238,073 B1 * 5/2001 Ito ........................ B60Q 1/0052
362/236

(Continued)

FOREIGN PATENT DOCUMENTS

| CN | 101603665 A | 12/2009 |
|----|-------------|---------|
| CN | 102954403 A | 3/2013  |
| TW | M245367 U   | 10/2004 |

*Primary Examiner* — Ali Alavi
(74) *Attorney, Agent, or Firm* — Steven Reiss (57) ABSTRACT

A backlight module includes a light-guiding assembly and a light source assembly. The light-guiding assembly includes a back cover, a reflector, a light-guiding plate (LGP), a number of optical correcting elements, and a frame. The light source assembly includes a main body and a light source. The back cover defines a light input area. The main body includes two reflection sides. The two reflection sides curve over the light source. The main body defines a main body opening between the two reflection sides. The light source assembly further includes a lens received in the main body opening. The light emitted from the light source and reflected by the two reflection sides are transmitted to outside of the main body through the lens.

18 Claims, 8 Drawing Sheets

(51) Int. Cl.
*F21V 8/00* (2006.01)
*F21V 13/04* (2006.01)
*F21V 29/00* (2015.01)
*F21V 5/04* (2006.01)
*F21V 7/10* (2006.01)
*F21V 13/12* (2006.01)
*F21K 9/60* (2016.01)
*F21V 29/74* (2015.01)
*F21Y 101/00* (2016.01)
*F21Y 103/10* (2016.01)
*F21Y 115/10* (2016.01)

(52) U.S. Cl.
CPC ............... *G02B 6/0068* (2013.01); *G02F 2001/133607* (2013.01); *G02F 2001/133628* (2013.01)

(56) References Cited

U.S. PATENT DOCUMENTS 7,255,459 B2 * 8/2007 Kuan ............... F21L 4/027
362/247
8,104,923 B2 * 1/2012 Nagai ............... H01L 25/0753
362/240

* cited by examiner

BACKLIGHT MODULE AND LIGHT SOURCE ASSEMBLY OF THE BACKLIGHT MODULE

FIELD

The subject matter herein generally relates to the field of liquid crystal display, and in particular to a direct type backlight module and a light source assembly used therein.

BACKGROUND

A liquid crystal display apparatus includes a liquid crystal display panel displaying an image using light transmittance of liquid crystal and a backlight module disposed under the liquid crystal display panel to provide light to the liquid crystal display panel. The backlight module includes a plurality of light sources generating light required to display an image on the liquid crystal display panel. The backlight module can be classified as a direct type or as an edge type. In the direct type backlight module, the light sources are disposed under the liquid crystal display panel corresponding to an entire area of the liquid crystal display panel. In the edge type backlight module, the light sources are disposed under the liquid crystal display panel at a position corresponding to an edge portion of the liquid crystal display panel.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "outside" refers to a region that is beyond the outermost confines of a physical object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 1:
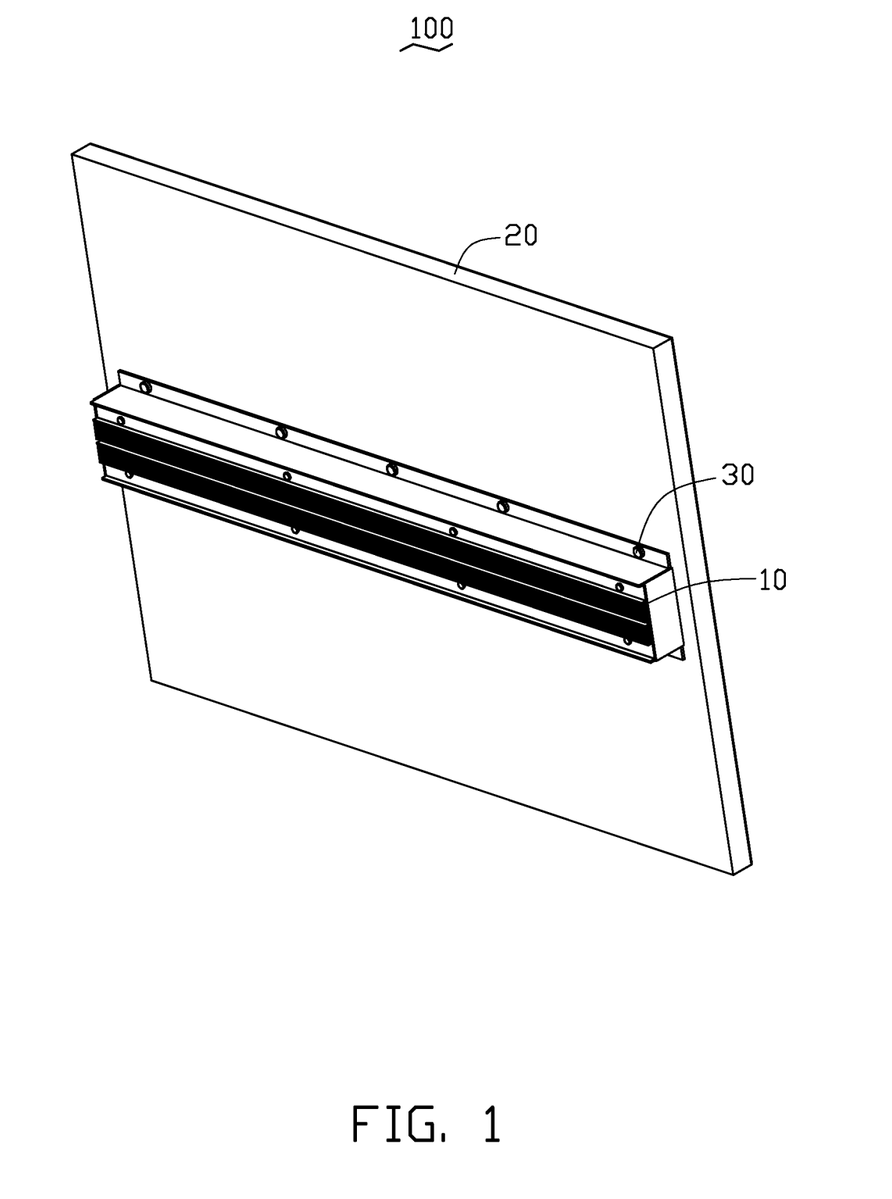
FIG. 1 is a perspective view of an embodiment of a backlight module.

FIG. 1 illustrates an embodiment of a backlight module 100. The backlight module 100 can include a light source assembly 10 and a light-guiding assembly 20. The light source assembly 10 can be mounted to a substantially central portion of the light-guiding assembly 20.

Figure 2:
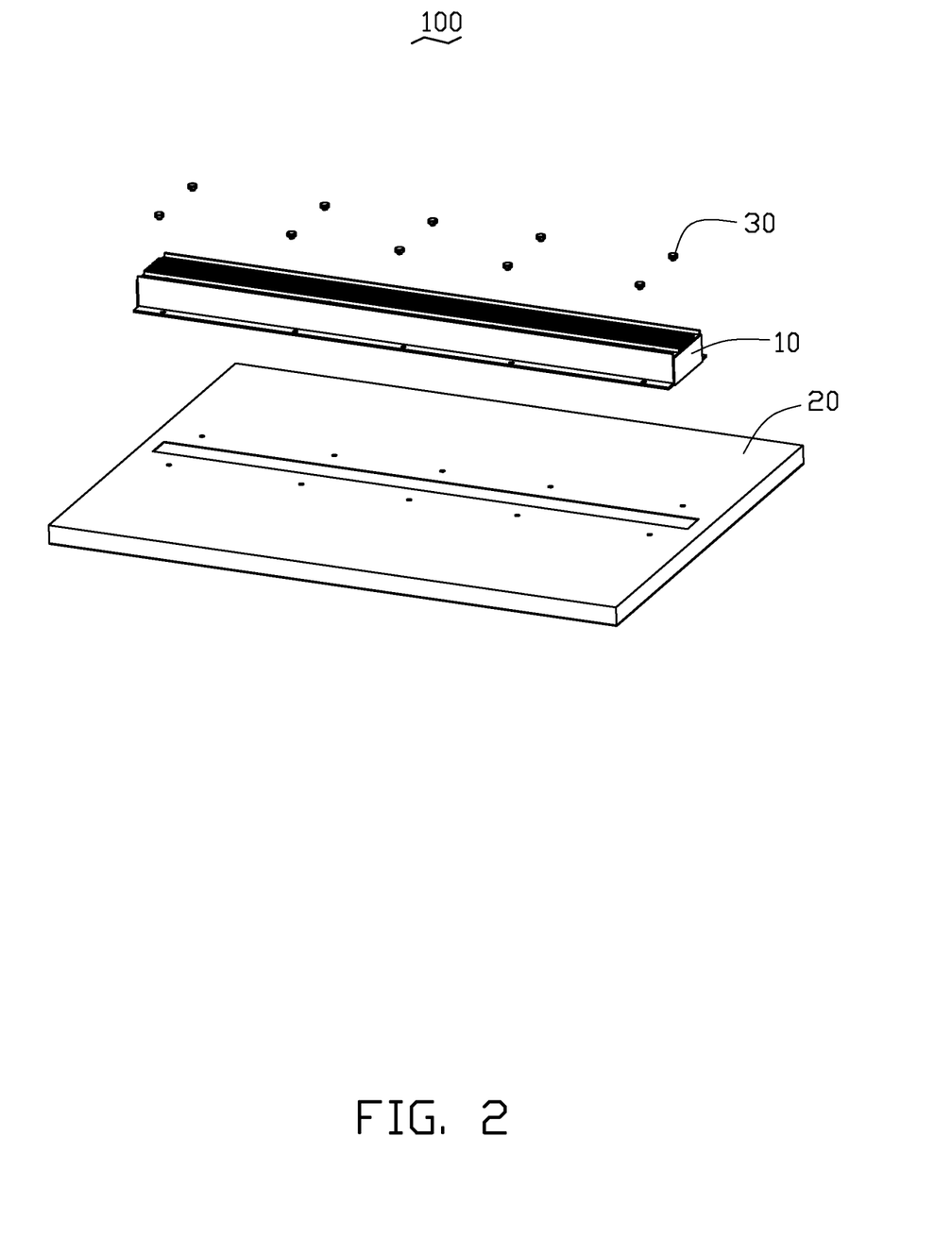
FIG. 2 is an exploded perspective view of the backlight module as shown in FIG. 1.
Figure 3:
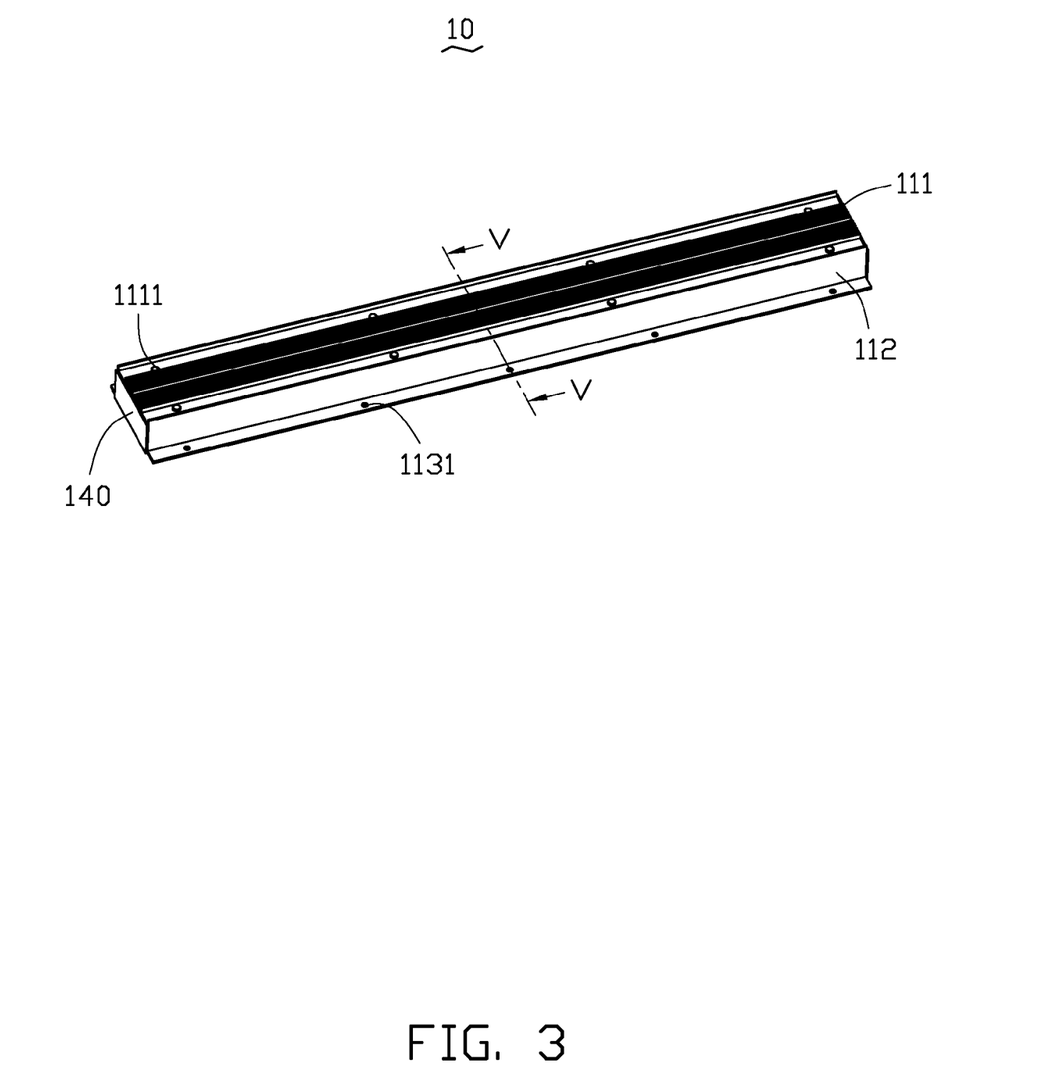
FIG. 3 is a perspective view of a light source assembly of the backlight module as shown in FIG. 1.

FIGS. 2-3 illustrate that the light source assembly 10 can be detachably mounted to the light-guiding assembly 20 by a plurality of screws 30.

Figure 4:
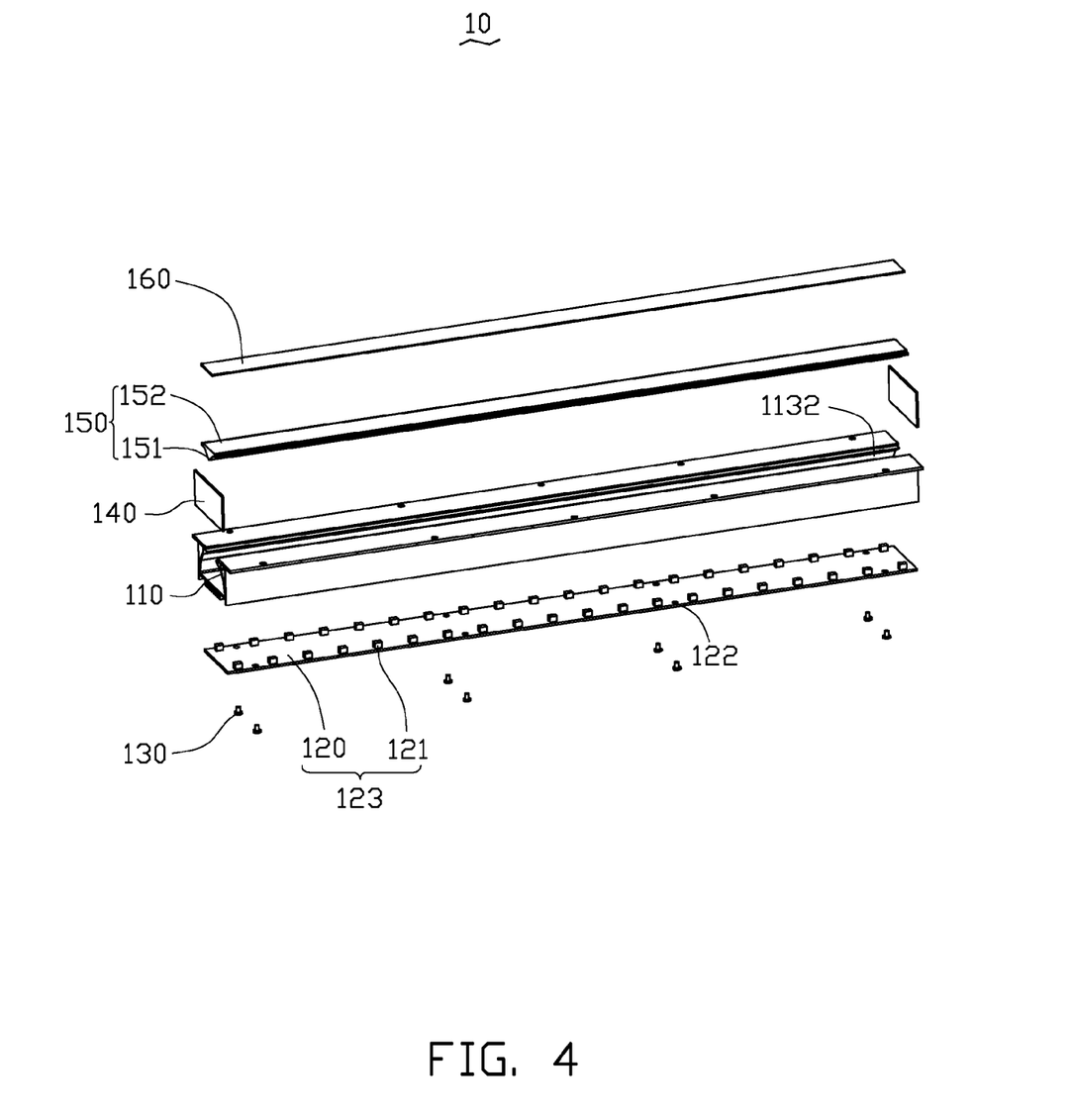
FIG. 4 is an exploded perspective view of the light source assembly as shown in FIG. 3.

FIG. 4 illustrates that the light source assembly 10 can include a main body 110, a light source 123, a plurality of screws 130, two end panels 140, a lens 150, and a light-sealing strip 160.

The main body 110 can be substantially "U"-shaped. The light source 123 can include an LED base board 120 having a plurality of LEDs 121 fixed thereon. The LED base board 120 can be substantially rectangular, and the plurality of LEDs 121 can be arranged along a lengthwise direction of the LED base board 120. In the illustrated embodiment, the LEDs 121 can be arranged in two rows, and each row of LEDs 121 can be adjacent to a corresponding long edge of the LED base board 120. A plurality of first holes 122 can be defined in the LED base board 120.

The two side boards 140 can be substantially rectangular and mounted to respective ends of the main body 110. The two side boards 140 can prevent light from emitting out of the two ends of the main body 110. In at least one embodiment, an inner surface of the two side boards 140 can be attached with a high-reflectance film having a reflectivity of about 0.9 or more.

Figure 5:
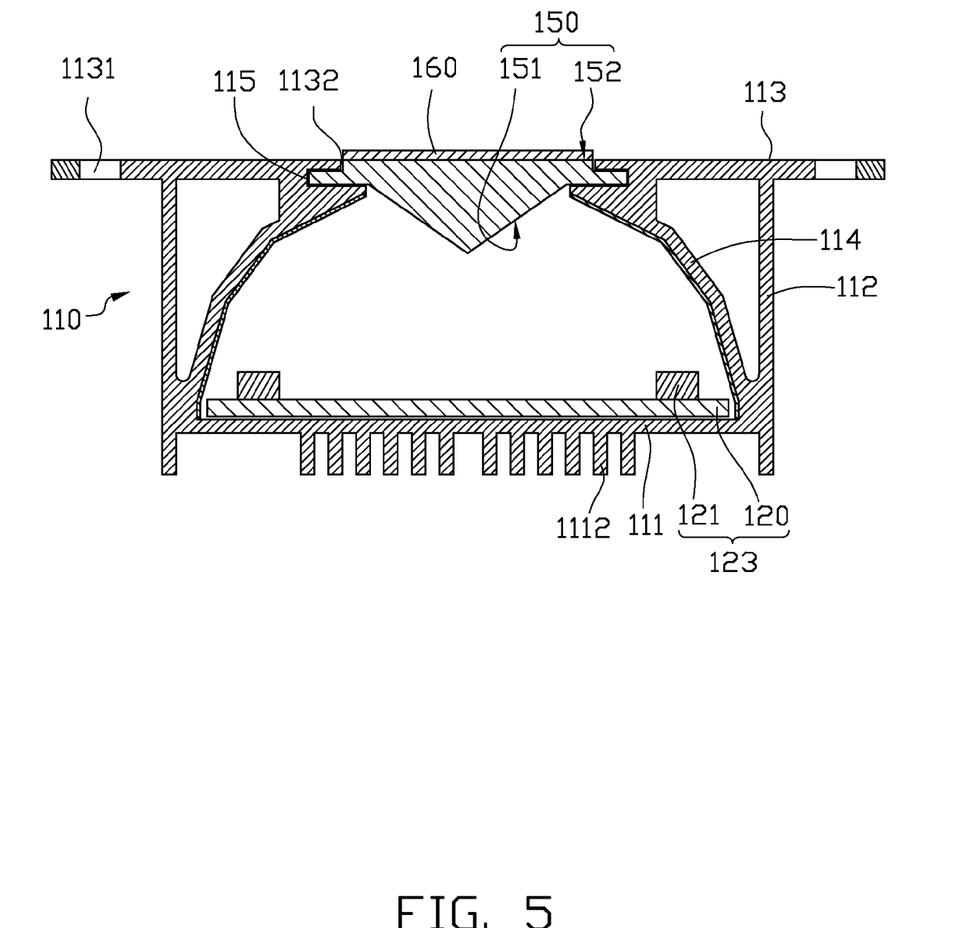
FIG. 5 is a cross-sectional view of the light source assembly of FIG. 3 taken along line V-V.

FIG. 5 illustrates that the main body 110 can include a bottom board 111, two sidewalls 112 opposite to each other, a top board 113, and two curved reflection sides 114. The two reflection sides 114 can be located between the two sidewalls 112.

The bottom board 111 can be substantially rectangular. The bottom board 111 can define a plurality of second holes 1111 (shown in FIG. 3) configured for fixing the LED base plate 120 to the main body 110. In at least one embodiment, the bottom board 111 can be made of heat-dissipating material. An outer surface of the bottom board 111 can include at least one heat dissipation fin 1112. The heat dissipation fin 1112 can be integrally formed with the bottom board 111.

The two sidewalls 112 can extend in the same direction. The top board 113 can be located on top of the two sidewalls 112. A width of the top board 113 can be greater than a distance between the two sidewalls 112. Each portion of the top board 113 that can be located outside of the two sidewalls 112 can define a plurality of third holes 1131 configured to fix the light source assembly 10 to the light-guiding assembly 20. A substantially central portion of the top board 113 facing the light source 123 can define a main body opening 1132 configured for receiving the lens 150. The main body opening 1132 can be located between the two reflection sides 114.

Each reflection side 114 can be a smooth camber or a continuous plane, and curve over a corresponding row of the LEDs 121 of the light source 123. One end portion of each reflection side 114 can connect to a joint portion of the corresponding sidewall 112 and the bottom board 111. Another end portion of each reflection side 114 can connect to a portion of the top board 113 adjacent to the main body opening 1132. The inner surface of the reflection side 114 adjacent to the light source 123 can be attached with a high-reflectance film having a reflectivity of about 0.9 or more. In at least one embodiment, a groove 115 can be defined between the top board 113 and each reflection side 114. A portion of the lens 150 can be received in the grooves 115.

The LED base board 120 can be attached to the bottom board 111 by the screws 130 inserting through the corresponding second holes 1111 and the corresponding first holes 122, and a size of the LED base board 120 can be smaller than a size of the bottom board 111. In other embodiments, the LED base board 120 can be attached to the bottom board 111 by other known methods.

The lens 150 can be received in the main body opening 1132 of the main body 110. The lens 150 can include a light incident surface 151 facing the LEDs 121, and a light emitting surface 152 opposite to the light incident surface 151. In the illustrated embodiment, the light incident surface 151 can be substantially "V"-shaped. In other embodiments, the light incident surface 151 can be substantially hemispherical or other shapes. Light emitted from the light source 123 can enter into the lens 150 through the light incident surface 151, and transmit out of the lens 150 through the light emitting surface 152. The lens 150 can adjust an emitting angle of the light from the light source 123 to optimize an amount of light entering into the light-guiding assembly 20.

The thermal gasket 160 can be attached to the light emitting surface 152 of the lens 150, and the light-guiding assembly 20. The thermal gasket 160 can be made of elastic, transparent material, such as transparent silica. The thermal gasket 160 can prevent the light transmitting from the lens 150 from emitting to outside of the light-guiding assembly 20, thereby improving efficiency of transmitting the light to the light-guiding assembly 20.

Figure 6:
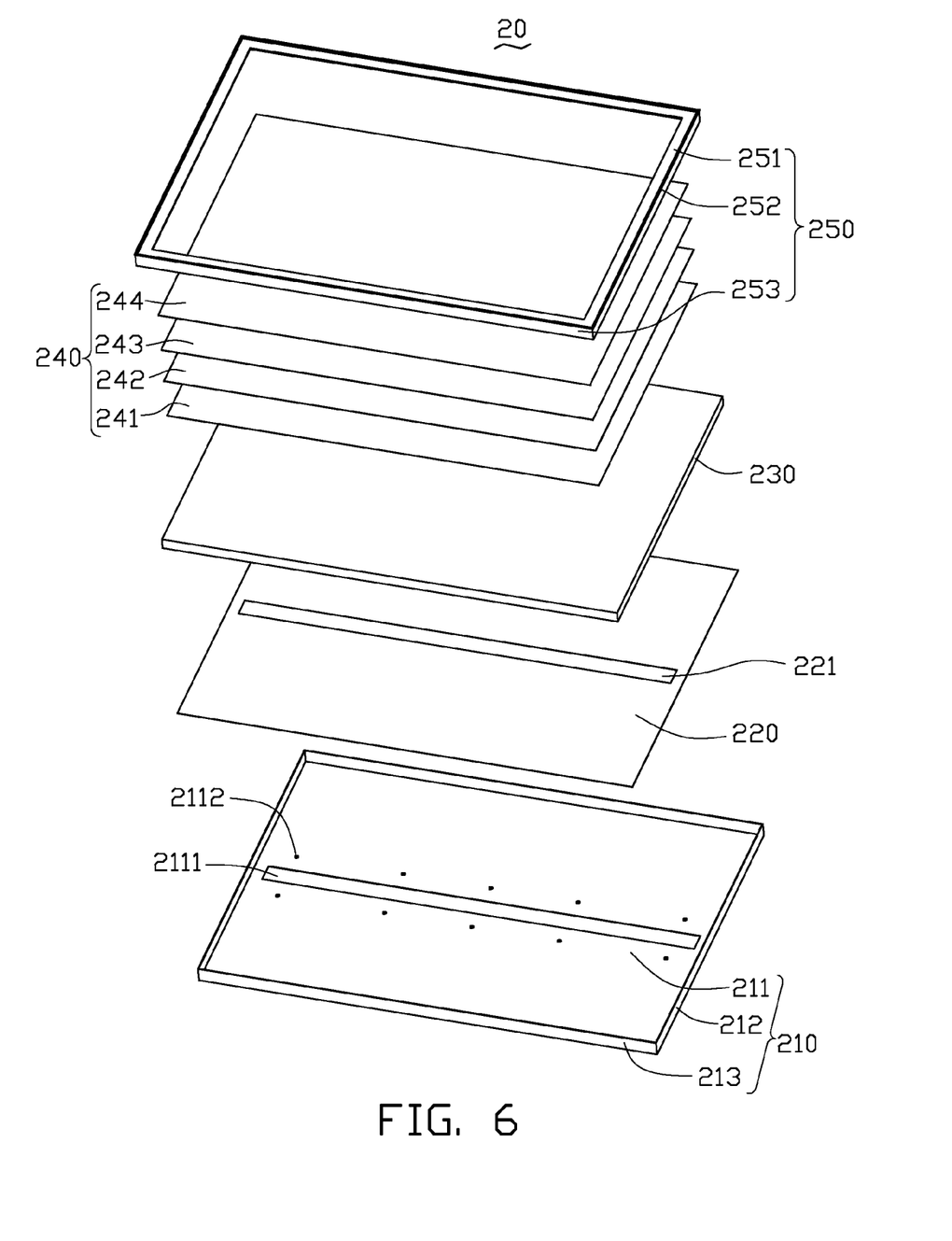
FIG. 6 is an exploded perspective view of the light-guiding assembly as shown in FIG. 1.

FIG. 6 illustrates that the light-guiding assembly 20 can include a back cover 210, a reflector 220 attached to an inner surface of the back cover 210, a light-guiding plate (LGP) 230 attached to the reflector 220, a plurality of optical correcting elements 240 attached to the LGP 230, and a frame 250.

The back cover 210 can be substantially rectangular and include a panel 211, two first sidewalls 212 opposite to each other, and two second sidewalls 213 opposite to each other. The two first sidewalls 212 and the two second sidewalls 213 can surround the panel 211. The two first sidewalls 212, the two second sidewalls 213, and the panel 211 can cooperatively define a receiving portion (not labeled). The reflector 220, the LGP 230, and the plurality of optical correcting elements 240 can be received in the receiving portion. A substantially central portion of the panel 211 can define a light input area 2111. The light input area 2111 can be substantially rectangular. One side of the thermal gasket 160 can be attached to the surface of the lens 150, and another side of the thermal gasket 160 can be sealed inside of the light input area 2111. Thus, the light can enter the light-guiding assembly 20 via the lens 150 and the thermal gasket 160. The panel 211 can define a plurality of fourth holes 2112 adjacent to opposite sides of the light input area 2111. The light source assembly 10 can be mounted to the light-guiding assembly 20 by the plurality of screws 30 (shown in FIG. 1) inserting through the corresponding third holes 1131 and the corresponding fourth holes 2112. In other embodiments, the light source assembly 10 can be mounted to the light-guiding assembly 20 by other known methods.

The reflector 220 can be a substantially rectangular sheet attached to the panel 211. The reflector 220 can be made of materials with high reflectance. A substantially central portion of the reflector 220 can define at least one substantially rectangular opening 221.

The LGP 230 can be attached to the reflector 220 and made of high light-dispersive materials. The LGP 230 can disperse the light therein uniformly.

The optical correcting elements 240 can include at least one optical film attached to a surface of the LGP 230. In the illustrated embodiment, the optical correcting elements 240 can be a first diffusion sheet 241, a first prism lens 242, a second prism lens 243, and a second diffusion sheet 244.

The frame 250 can be substantially rectangular and made of plastic. In other embodiments, the frame 250 can be made of aluminum or other materials. The frame 250 can include a frame portion 251, two third sidewalls 252 opposite to each other, and two fourth sidewalls 253 opposite to each other. The two third sidewalls 252 and the two fourth sidewalls 253 can extend from peripheral edges of the front plate 251. The frame 250 can be received in the receiving portion of the back cover 210, such that the two third sidewalls 252 and the two fourth sidewalls 253 contact inner surfaces of the two first sidewalls 212 and the two second sidewalls 213, respectively. Thus, the reflector 220, the LGP 230, and the plurality of optical correcting elements 240 can be tightly sealed between the back cover 210 and the frame 250.

Figure 7:
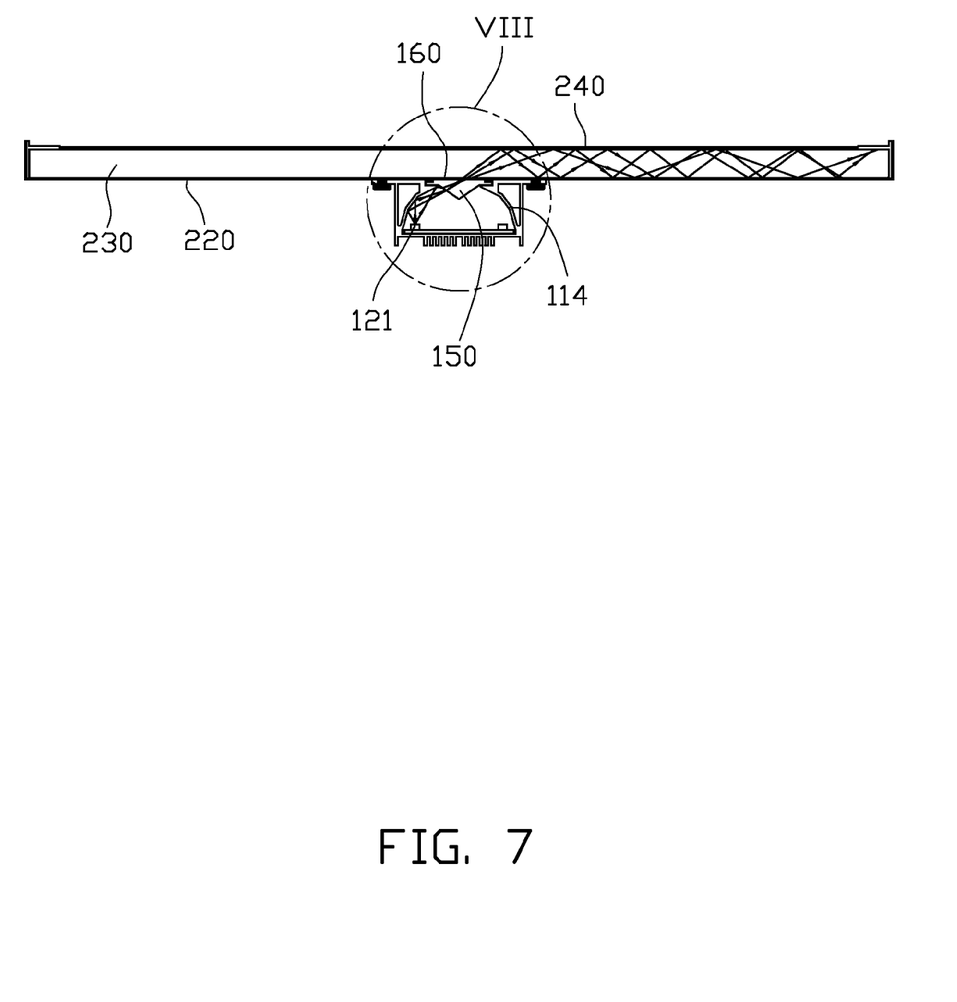
FIG. 7 is a distribution graph of light emission angles of the backlight module as shown in FIG. 1.

Referring to FIG. 7, a portion of the light emitted from the LEDs 121 can be transmitted to the lens 150. Another portion of the light emitted from the LEDs 121 can be reflected by the reflection sides 114 to the lens 150.

Figure 8:
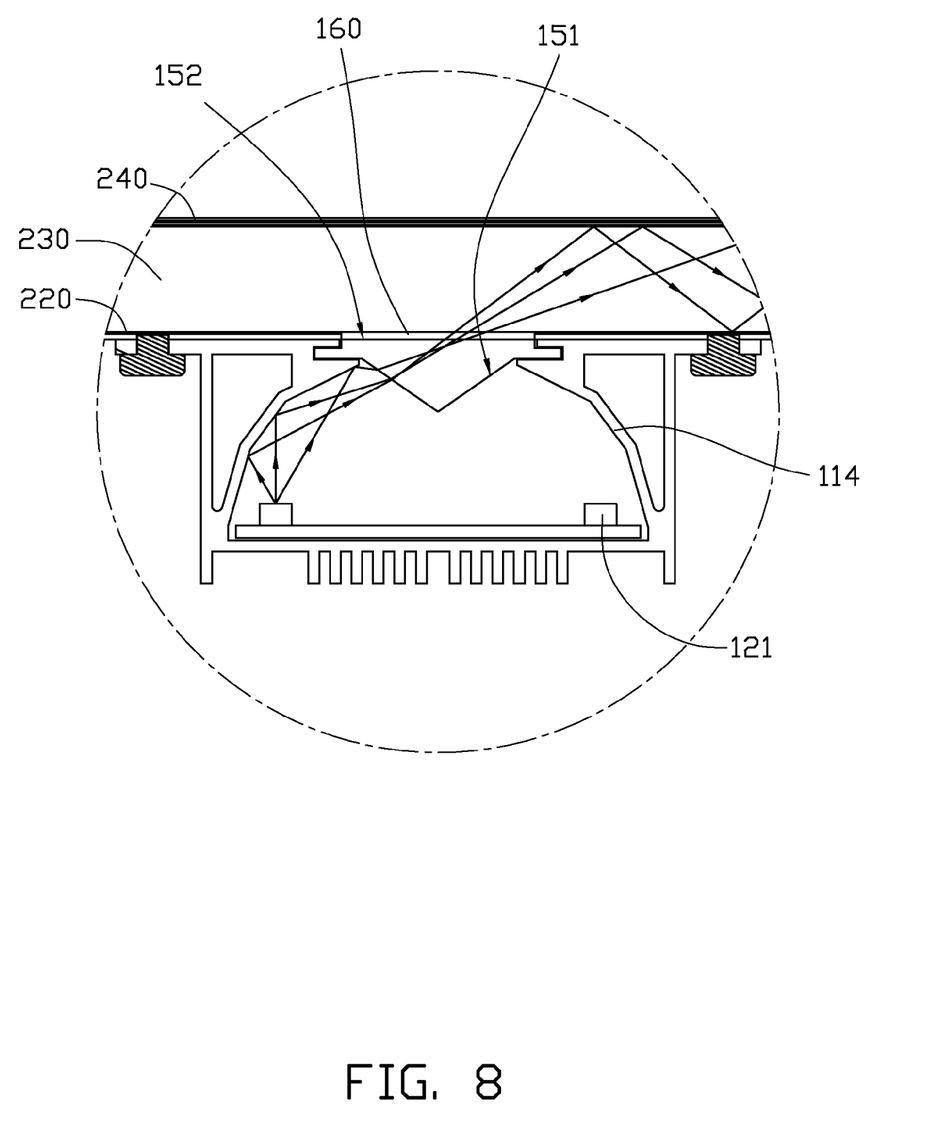
FIG. 8 is an enlarged view of circled portion VIII of FIG. 7.

Referring to FIG. 8, the light transmitted to the light incident surface 151 of the lens 150 can enter the lens 150, and then be scattered into the LGP 230 through the light emitting surface 152. The light transmitted through the LGP 230 can be reflected back and forth by the optical correcting elements 240 and the reflector 220. Thus, the light can be dispersed evenly by the optical correcting elements 240.

The embodiments shown and described above are only examples. Many details are often found in the art such as the other features of a backlight module 100. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:
1. A light source assembly comprising:
 a main body comprising a bottom board and two reflection sides, the two reflection sides attached on the bottom board, the reflection sides positioned opposite each other to form a main body opening;
a light source mounted on the bottom board; and
a lens positioned within the main body opening;
wherein, light from the light source is reflected by at least one of the two reflection sides and transmitted through the lens to outside the main body; and
wherein the lens comprises a light incident surface facing the light source and a light emitting surface opposite to the light incident surface, the light incident surface is convex, the light incident surface is protruded towards the light source, and the light incident surface is V-shaped.

2. The light source assembly of claim 1, wherein the light source comprises a light emitting diode (LED) base board and a plurality of LEDs fixed on the LED base board.

3. The light source assembly of claim 1, wherein the light source assembly further comprises a light-sealing strip attached to the emitting surface of the lens, and the light-sealing strip is made of elastic transparent material.

4. The light source assembly of claim 1, wherein the reflection side is a camber, and wherein the reflection side has an inner surface, the inner surface is smooth.

5. The light source assembly of claim 1, wherein the reflection side has an inner surface, the inner surface of the reflection side adjacent to the light source is reflective.

6. The light source assembly of claim 1, wherein the main body further comprises a sidewall and a top board, the sidewall extends from the same direction of the bottom board, the top board connects to the sidewall; and wherein the main body opening is defined in the top board.

7. The light source assembly of claim 6, wherein one end portion of each reflection side connects to a joint portion of the corresponding sidewall and the bottom board.

8. The light source assembly of claim 7, wherein another end portion of each reflection side connects to a portion of the top board adjacent to the main body opening.

9. The light source assembly of claim 6, wherein a groove is defined between the top board and each reflection side, a portion of the lens is received in the grooves.

10. The light source assembly of claim 1, wherein the bottom board comprises a plurality of heat dissipation fins integrally formed with the bottom board.

11. The light source assembly of claim 1, wherein the main body further comprises two side boards, the two side boards are attached to the sidewall, each of the two side boards is mounted to a respective end of the main body.

12. A backlight module comprising:
a light-guiding assembly comprising:
  a back cover;
  a reflector attached to the back cover;
  a light-guiding plate (LGP) attached to the reflector;
  a plurality of optical correcting elements attached to the LGP; and
  a frame;
a light source assembly mounted to a central portion of the light-guiding assembly, the light source assembly comprising:
  a main body comprising a bottom board and two reflection sides, the two reflection sides attached on the bottom board, the reflection sides positioned opposite each other to form a main body opening;
  a light source mounted on the bottom board; and
  a lens received in the main body opening;
wherein the back cover defines a light input area; and
wherein light from the light source is reflected by at least one of the two reflection sides and transmitted through the lens to outside the main body.

13. The backlight module of claim 12, wherein the light source assembly further comprises a light-sealing strip attached to the emitting surface of the lens, and the light-sealing strip is made of elastic transparent material.

14. The backlight module of claim 12, wherein the main body further comprises a sidewall and a top board, the sidewall extends from the same direction of the bottom board, the top board connects to the sidewall, and wherein the main body opening is defined in the top board.

15. The backlight module of claim 12, wherein the bottom board comprises a plurality of heat dissipation fins integrally formed with the bottom board.

16. The backlight module of claim 12, wherein the light source comprises an LED base board and a plurality of LEDs fixed on the LED base board.

17. The backlight module of claim 12, wherein the reflector is a rectangular sheet, a rectangular opening is defined on a center portion of the reflector; and
wherein the light input area and the opening are arranged to face each other, the light emitted from the light source enters the light-guiding assembly via the light input area and the opening.

18. The backlight module of claim 12, wherein the lens comprises a light incident surface and a light emitting surface, and the light incident surface is V-shaped.

* * * * *